E. H. KEENAN, J. P. CHRISTIANSEN AND R. RUEMELIN.
TRANSCRIBING INSTRUMENT.
APPLICATION FILED OCT. 29, 1918.
1,309,600.
Patented July 8, 1919.
2 SHEETS—SHEET 2.
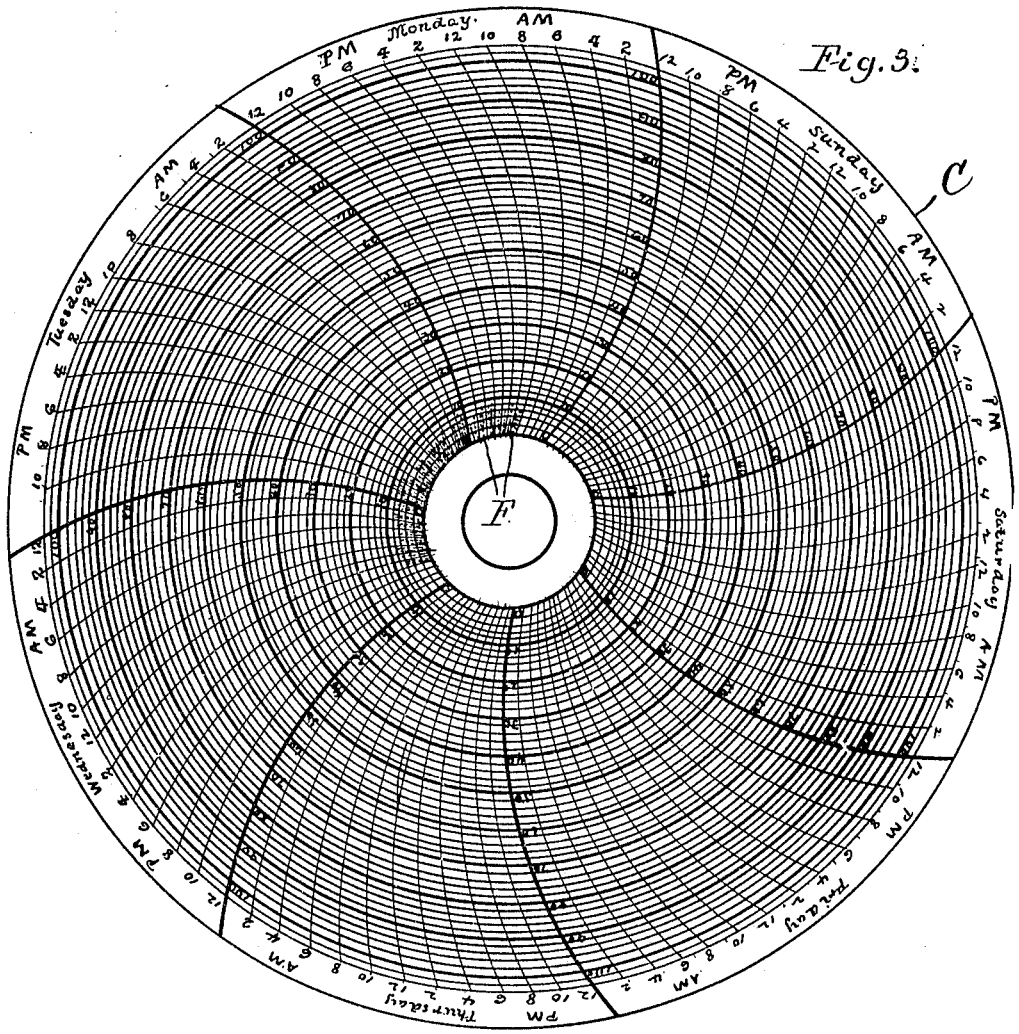
Inventors: Edward H. Keenan,
Jens P. Christiansen,
Richard Ruemelin,
by: Bradbury
Attorney.

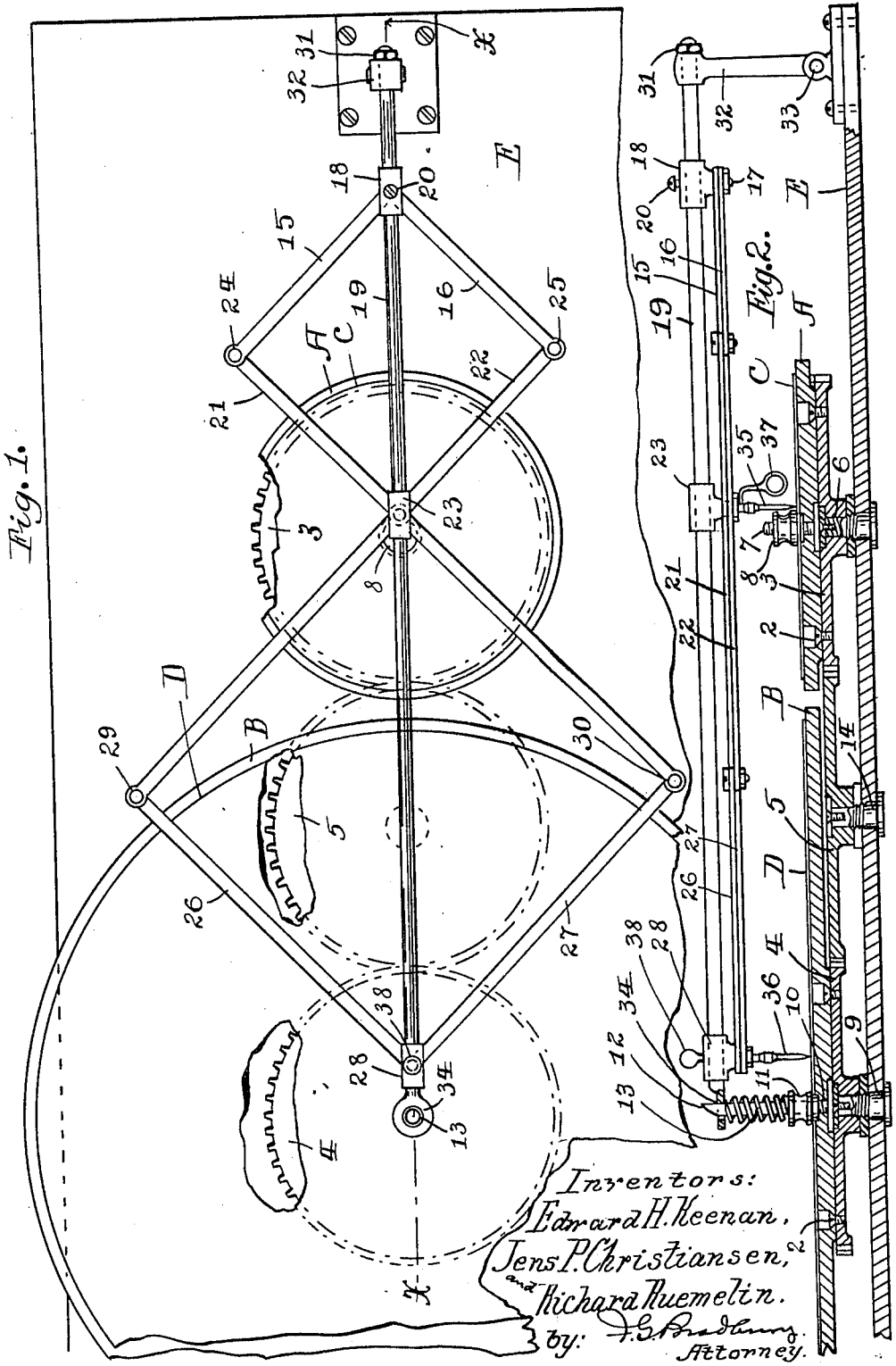

UNITED STATES PATENT OFFICE.

EDWARD H. KEENAN, JENS PETER CHRISTIANSEN, AND RICHARD RUEMELIN, OF STILLWATER, MINNESOTA, ASSIGNORS OF ONE-HALF TO TWIN CITY FORGE & FOUNDRY COMPANY, A CORPORATION OF MINNESOTA.

TRANSCRIBING INSTRUMENT.

1,309,600.

Specification of Letters Patent.

Patented July 8, 1919.

Application filed October 29, 1918. Serial No. 260,140.

*To all whom it may concern:*

Be it known that we, EDWARD H. KEENAN, JENS P. CHRISTIANSEN, and RICHARD RUEMELIN, citizens of the United States, residing at Stillwater, in the county of Washington and State of Minnesota, have invented a new and useful Improvement in Transcribing Instruments, of which the following is a specification.

This invention relates to an instrument by means of which graphic charts which are used on electric meters for recording, commonly termed "peak loads" are transcribed on an enlarged scale, in such manner that absolute average peak loads can be determined. Heretofore it has not been possible to determine an average of peak loads with such precision and accuracy as to satisfy the consumer and producer of electric current, and in consequence charges for electric current have been arrived at in a more or less haphazard and unsatisfactory manner. By the use of our invention this objection is entirely overcome. The improvement is further adapted to combine several operations on one chart for checking peak loads and accounting distributions, thereby minimizing the amount of work necessary to arrive at a computation. The invention is also adapted to enlarge meter charts with large multipliers to a point where the multipliers can either be made smaller or eliminated. The invention will further give to the superintendent of operation of a large industry using electric power, a chart showing the weak points of production. For instance, it will show if the shift is quitting early to wash up or if the new shift is slow in getting started, etc.

By the use of our invention, the user purchasing electric current on a demand basis determined by a graphic chart can get a more accurate check from the producer, especially if the current is metered on more than one meter.

The invention further is adapted to transcribe any and all graphic charts.

With these and other objects and advantages in view, our invention comprises the features of construction and combination of parts hereinafter more particularly described and claimed.

In the accompanying drawings forming part of this specification Figure 1 is a plan of a portion of our invention, parts of the base and of the platens being broken away; Fig. 2 is a section taken on the line X—X of Fig. 1, and Fig. 3 is a plan of one of the original or smaller records or charts which our invention is adapted to enlarge for ease of reading and tabulating the same.

Our invention is provided with two disk platens A and B, the small platen A being adapted to receive and hold the original or small record C and the large platen adapted for receiving the large or reproducing record D, said platens being pivotally mounted at their centers about independent axes on a rigid base plate E. Each platen has rigidly secured thereto a gear wheel on its lower surface by screws 2 or other suitable means, the gear 3 being secured to the platen A and the gear 4 to the platen B. The teeth of these gears mesh with the teeth of an interpositioned transmission gear 5 which is pivotally mounted upon the base plate E. The sizes of the gears 3 and 4 are proportioned so that any rotation of the smaller platen is positively imparted to the large platen at a fixed ratio depending upon the enlargement of charts desired. The pivot connection between the base plate and the platen A is produced by means of the bolt 6 secured to the gear wheel 3 and by means of the stud bolt 7 secured to the platen A, the threaded shank of said stud bolt 7 projecting upwardly above the platen and over which the record C may be placed and detachably clamped by the thumb nut 8. The pivot connection between the base plate E and the platen B is by means of the pivot bolt 9 secured to the base plate and stud bolt 10 secured to the platen B and having a threaded upwardly extending shank over which the record D is placed and clamped by the thumb nut 11. The shank of the stud bolt 10 projects upwardly above the thumb nut and is beveled at 12. This shank receives an expansion coil spring 13 for purposes to be hereinafter described. The pivot support between the base plate E and the gear wheel 5 is by means of a pivot bolt 14.

For the reproduction of radii or ordinates F which constitute the record of peak loads on an enlarged scale a system of common levers or what is commonly termed a pantograph may be employed, said system of levers having either a fixed or selectively positioned center in relation to the pivots of the platens. This lever system, preferably, has a ratio between the platen gears so that the ordinates F of the record mounted on the small platen are multiplied or enlarged at a pre-arranged ratio. The pantograph as illustrated is composed of 3 pairs of levers. The levers 15 and 16 constitute one pair having two of their ends pivoted by the pin 17 (see Fig. 2) on a common support 18, which is slidably supported on shaft 19 and held in selected position on said shaft by the bolt 20 to regulate the ratio of enlargement of the radii or ordinates. The pair of levers 21 and 22 are pivoted together between their ends upon a stylus support 23 which is slidably mounted upon said shaft. The outer free ends of the levers 21 and 22 are pivotally attached by pivots 24 and 25 to the outer free ends of the levers 15 and 16. The levers 26 and 27 constitute a third pair having two of their ends pivoted to a stylus support 28 which is slidably mounted upon the shaft 19 and their outer ends pivotally secured to the outer ends of the long members of levers 21 and 22 by the pivots 29 and 30.

The shaft 19 is secured by means of the nut 31 to the upper free end of the rocker arm 32, said rocker arm being hingedly supported at 33 on the base plate E so that the free end of the shaft can be swung up and down while extending diametrically across the platens and can be removed from directly over the platens to permit the adjustment of charts on the platens. The free end of the shaft 19 has an eye 34 through which the beveled end 12 of the shank 10 of the pivot may project upwardly to steady and support the free end of the shaft laterally. This eye member presses down upon the spring 13 when the shaft is lowered, said spring being adapted to urge the shaft upwardly with the stylus members 35 and 36 out of contact with the records C and D. The stylus members 35 and 36 are respectively in the form of a tracing point and a marking point of any suitable form detachably secured to the supports 23 and 28. The stylus points are adapted for following the ordinates F on the original record C and transcribing them on an enlarged scale on the record D at a given ratio of enlargement. A magnifying glass 37 in juxtaposition to the stylus 35 enables the operator to more accurately trace the radii or ordinates from the orginal record. A small handle piece 38 on the stylus support 28 facilitates the manipulation of the stylus points 36 and 35 by hand against the tension of the spring 13. In operation the turn tables or platens are turned by hand and the master or tracing stylus 35 made to follow the radii or ordinates indicating peak loads on the original record. During this operation the marking stylus 36 will inscribe the ordinates thus traced on the magnified record D, for ease of comparison and tabulation. The rotation of the large platen is positively at a fixed ratio of enlargement of circular arcs through the gear connection between the platens. This same ratio of enlargement exists in the system of levers constituting the pantograph. The radii or ordinates of the master record are multiplied or enlarged in the same ratio as the circular arcs, and the enlarged record is of exact enlarged proportions as the small record. Thus the invention is adapted for magnifying several small records the reproduction being upon a single larger record. The apparatus is also adapted for enlarging several records of various scales and reproducing these upon a single record of a known enlarged scale. The device is further adapted for reproducing and enlarging circular records of odd scale. The invention further can be used for enlarging continuous strips and circular records to a known scale for ease of tabulation and comparison.

In accordance with the patent statutes, we have described the principles of operation of our invention together with the apparatus which we now consider to represent the best embodiment thereof, but we desire to have it understood that the construction shown is only illustrative, and that the invention can be carried out by other means and applied to uses other than those above set forth within the scope of the following claims.

Having described our invention, what we claim as new and desire to protect by Letters Patent is:—

1. An instrument for transcribing graphic charts, comprising, in combination, a primary movable platen for supporting a chart to be transcribed, a secondary movable platen for supporting a chart to receive the transcription, said platens being movably connected whereby the secondary platen is moved positively in one direction at a fixed ratio to the movement of the primary platen depending on the enlargement desired, and means for transcribing radii or ordinates on an enlarged scale from the primary to the secondary chart.

2. An instrument for transcribing graphic charts, comprising, in combination, a primary revoluble platen for supporting a chart to be transcribed, a secondary revoluble platen for supporting a chart to receive the transcription, said platens being movably connected to revolve at a fixed ratio of speed to assist in transcribing circular arcs from one chart to the other at a fixed ratio of enlargement, and means for transcribing radii or ordinates in the same ratio as its circular arcs from one of said charts to the other.

3. An instrument for transcribing graphic charts, comprising in combination, a primary revoluble platen, for supporting a chart to be transcribed, a secondary revoluble platen for supporting a chart to receive the transcription, said platens being movably connected to revolve at a fixed ratio of speed to assist in transcribing circular arcs from one chart to the other at a fixed ratio of enlargement, and means for transcribing radii or ordinates in the same ratio as its circular arcs from one of said charts to the other, said last mentioned means having an adjustable center in relation to the axes of said platens to regulate the enlargement of said radii or ordinates.

4. An instrument for transcribing graphic charts, comprising, in combination, a primary revoluble platen for supporting a chart, to be enlarged, a secondary revoluble platen for supporting a chart to receive the enlargement, said platens being movably connected to revolve at a fixed ratio of speed, to enlarge circular arcs from one chart to the other, a shaft extending diametrically over said platens and hingedly supported to swing upwardly away from directly over said platens, and a system of extensible levers pivoted together and on said shaft, said levers carrying a stylus over each record, one for tracing radii or ordinates on the chart to be enlarged and the other for marking said radii or ordinates on said chart to receive said enlargement at a fixed ratio of enlargement.

5. An instrument for transcribing graphic charts, comprising, in combination, a primary revoluble platen for supporting a chart to be enlarged, a secondary revoluble platen mounted on a pivot for supporting a chart to receive the enlargement, said platens being movably connected to revolve at a fixed ratio of speed to enlarge circular arcs from one chart to the other, a shaft extending diametrically over said platens and hingedly supported to swing upwardly away from directly over said platens, a system of extensible levers pivoted together and on said shaft, said levers carrying a stylus over each record, one for tracing radii or ordinates on the chart to be enlarged and the other for marking said radii or ordinates on said chart to receive said enlargement at a fixed ratio of enlargement, the free end of said shaft being coupled over the pivot of said secondary platen, and a spring over said pivot normally urging the free end of said shaft upwardly.

In testimony whereof, we have signed our names to this specification.

EDWARD H. KEENAN.
JENS PETER CHRISTIANSEN.
RICHARD RUEMELIN.

Copies of this patent may be obtained for five cents each, by addressing the "Commissioner of Patents, Washington, D. C."